United States Patent
Härtel et al.

(10) Patent No.: US 9,850,075 B2
(45) Date of Patent: Dec. 26, 2017

(54) METHOD FOR PROCESSING CONTAINERS AND CONTAINER PROCESSING MACHINE

(71) Applicant: KHS GmbH, Dortmund (DE)

(72) Inventors: Manfred Härtel, Weilerbach (DE); Andreas Fahldieck, Idar-Oberstein (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 14/894,594

(22) PCT Filed: Apr. 25, 2014

(86) PCT No.: PCT/EP2014/001113
§ 371 (c)(1),
(2) Date: Nov. 30, 2015

(87) PCT Pub. No.: WO2014/191073
PCT Pub. Date: Dec. 4, 2014

(65) Prior Publication Data
US 2016/0122133 A1    May 5, 2016

(30) Foreign Application Priority Data

May 28, 2013  (DE) .................. 10 2013 105 460

(51) Int. Cl.
*B65G 47/29* (2006.01)
*B65G 47/84* (2006.01)
(Continued)

(52) U.S. Cl.
CPC .............. *B65G 47/295* (2013.01); *B65C 9/40* (2013.01); *B65G 47/846* (2013.01); *B67C 3/007* (2013.01); *B65G 2201/0244* (2013.01)

(58) Field of Classification Search
CPC .............. B65G 47/846; B65G 47/295; B65G 2201/0244; B65C 9/40
See application file for complete search history.

(56) References Cited

U.S. PATENT DOCUMENTS 6,321,896 B1    11/2001  Zuccheri et al.
2010/0018838 A1*  1/2010  Kelley .................. B65G 33/06
                                                        198/471.1
(Continued)

FOREIGN PATENT DOCUMENTS

DE    15 32 585    2/1970
DE    25 13 373    10/1976
(Continued)

*Primary Examiner* — Mark A Deuble
(74) *Attorney, Agent, or Firm* — Occhiuti & Rohlicek LLP

(57) ABSTRACT

A method for processing containers in a container-processing machine includes identifying a first container behind an adjacent second container in a container flow, the first container being positioned within the container flow such that the first container will, absent intervention, occupy a first processing position that has been designated as not to be occupied by any container, holding the first container back, thereby causing the first container to move with a second velocity, that is less than the first velocity, forming a gap between the first and second containers, and releasing the first container. As a result of having been held back, will now occupy a second processing position instead of the first processing position.

19 Claims, 5 Drawing Sheets

(51) Int. Cl.
 *B65C 9/40* (2006.01)
 *B67C 3/00* (2006.01)

(56) References Cited

U.S. PATENT DOCUMENTS

| | | | |
|---|---|---|---|
| 2010/0147454 A1* | 6/2010 | Leykamm | B65C 9/1803 |
| | | | 156/256 |
| 2010/0163367 A1* | 7/2010 | Koishi | B65G 47/846 |
| | | | 198/377.07 |
| 2013/0139970 A1* | 6/2013 | Cordioli | B65C 9/00 |
| | | | 156/365 |
| 2013/0312896 A1* | 11/2013 | Giuliani | B65C 3/065 |
| | | | 156/64 |

FOREIGN PATENT DOCUMENTS

| | | |
|---|---|---|
| DE | 39 20 291 | 1/1991 |
| DE | 10 2008 008528 | 8/2009 |
| EP | 1 076 021 | 2/2001 |
| EP | 2 441 563 | 4/2012 |

\* cited by examiner

METHOD FOR PROCESSING CONTAINERS AND CONTAINER PROCESSING MACHINE

RELATED APPLICATIONS

This application is the national stage, under 35 USC 371, of international application PCT/EP2014/001113, filed on Apr. 25, 2014, which claims the benefit of the May 28, 2013 priority date of German application DE 102013105460.9, the contents of which are herein incorporated by reference.

FIELD OF INVENTION

The invention concerns container processing, and in particular, to container-processing machinery having defective processing elements.

BACKGROUND

A container processing machine typically includes a rotating conveyor element that has many processing stations for processing containers. The conveyor element is very often a rotor that can be driven to rotate about a vertical machine axis.

A variety of processing stations are possible depending on what sort of container processing is contemplated. Examples include: filling elements used in a filling machine for filling containers; sealing elements for use in a sealing machine or closing machine for sealing filled containers with a suitable container closure; inspection elements for use in an inspection machine for inspecting empty containers before filling and/or for inspecting filled containers; labeling elements used in a labeling machine for labeling containers, printing stations used in printing machine for the application of decoration in the form of printed images onto containers; and cleaning heads used in a cleaning machine for cleaning and/or sterilizing containers. With so many processing positions, it is almost inevitable that a few of them will eventually become defective. Containers at these defective positions will not be processed correctly. For example, containers processed at a defective filling station may not be filled to the correct level. Containers processed at a defective cleaning station may not be properly sterilized.

In many cases, it is not economical to shut down production to fix a small number of defective processing stations. After all, doing so will result in considerable lost production. It is more economical to simply discard those containers that have had the misfortune of having been processed by a faulty processing station.

SUMMARY

Although it is economically rational to simply discard containers that are known to have been processed by a faulty processing station, it is still the case that the discarded containers have a cost.

Among the objects of the invention is that of reliably preventing containers from being transferred into defective processing positions in the first place and doing so without a machine stoppage. This prevents containers from being incorrectly processed at defective processing positions, and thus avoids waste associated with discarding improperly processed containers.

The invention assumes that for each processing position on the circulating conveyor of the container-processing machine, there exists an unambiguous association with corresponding positions of the container flow on the conveying path of the container feed at any moment in normal problem-free operation. In the event that a processing position is not to be used and is thus also not to be occupied, for example in the event that a processing position is defective, it is possible to create, in the flow of containers on the conveying path of the container feed, a gap in the container flow and to do so in such a way that this gap, and not a container, is transferred to the processing position that is not to be occupied. The same applies similarly for two or more consecutive processing positions in the conveying direction of the conveyor element.

In one aspect, the invention features a method for processing containers in a container-processing machine that has a plurality of processing positions formed on a circulating conveyor. Such a method includes causing the containers to form a container flow that flows with a first velocity along a container path in a conveying direction, obtaining information indicative of an association between a position of a container in the container flow and a defined processing position on the conveyor, designating a first processing position from the plurality of processing positions as not to be occupied by any container, identifying a first container behind a second container in the container flow, the first container being positioned within the container flow such that the first container will, absent intervention, occupy the first processing position, holding the first container back, thereby causing the first container to move with a second velocity, that is less than the first velocity, forming a gap between the first and second containers, releasing the first container, and causing the first container to occupy a second processing position instead of the first processing position.

In some practices of the invention, designating a first processing position from the plurality of processing positions as not to be occupied by any container includes receiving information indicative of a fault in the first processing station.

In other practices of the invention, holding the first container back includes causing a retaining element to transition from a first state to a second state, wherein, when the retaining element is in the first state, the retaining element is outside the container path, and wherein, when the retaining element is in the second state, the retaining element acts as a barrier to forward movement of the first container. Among these are those practices that further including, after having formed the gap, and with the retaining element in the second state, moving the retaining element at the first velocity, while moving the retaining element, supporting the first container, and, upon reaching a feed that spaces the containers from each other prior to transferring the containers to processing positions, causing the retaining element to transition to the first state. Also among these practices are that that further include, after having formed the gap, causing the retaining element to move in a direction opposite the conveying direction to a starting position thereof.

In yet other practices, holding the first container back includes, from a starting position of the retaining element, accelerating the retaining element along the conveying direction, while the retaining element is moving at the first velocity, causing the retaining element to transition from the first state to the second state, and, with the retaining element in the second state, decelerating the retaining element to the second velocity thereby causing the first container to decelerate to the first velocity. Among these are practices that also include, after having formed the gap, accelerating the retaining element to the first velocity, and causing the first container to resume motion at the first velocity.

Certain alternative practices of the invention also include using a supporting element to support the second container while forming a gap between the first and second containers, and withdrawing the supporting element when the second container reaches a feed that spaces the containers from each other prior to transferring the containers to processing positions. Among these are those in which using the supporting element includes accelerating the supporting element from a starting position thereof, in which the supporting element is outside the conveying path, and, upon reaching a supporting position between the first and second containers, causing the supporting element to move at the first velocity so as to cause the supporting element to move synchronously with the containers in the container flow.

In another aspect, the invention features a container-processing machine for processing containers. Such a container-processing machine includes a circulating conveyor, processing positions disposed around the conveyor, a container feed that defines a container path in which a container flow includes containers moving at a first velocity in a conveying direction are brought towards the processing positions, and a retaining element that holds back the first container thereby causing a gap to form between adjacent first and second containers in the container flow. The processing positions comprise a first processing position that has been designated as not to be occupied by any container and a second processing position that is available for being occupied by a container. The container flow is such that a position of a container in the container flow is indicative of a particular processing position that is to be occupied by the container. In the absence of intervention by the retaining element, the first container would occupy the forbidden first processing position. However, as a result of the gap, the first container will instead occupy the second processing position and not the first one.

In some embodiments, the retaining element is configured to be moved from a starting position outside the container path and into a retaining position in which the retaining element holds back the first container. Among these embodiments are those that include a process computer. In some embodiments, the process computer causes the retaining element to move synchronously with the container flow while supporting the first container until the first container reaches a feed that spaces the containers from each other prior to transferring the containers to processing positions at which point the retaining element ceases to support the first container. In other embodiments, the process computer causes the retaining element to be accelerated in the conveying direction from a starting position, the acceleration continuing until the retaining element attains the first velocity, to cause the retaining element to transition into a retaining position, to decelerate to a second velocity, to decelerate the first container, and to thereby form a gap between the first and second containers. In some of these embodiments, the process computer also, after having caused the retaining element to form the gap, accelerates the retaining element to the first velocity, thus causing further growth of the gap to cease.

In some embodiments, a process computer causes the retaining element to return to a starting position thereof after the retaining element has been used to form the gap.

Alternative embodiments feature a supporting element that is configured to move at the first velocity and to support the second container.

Yet other embodiments include a carriage that supports the retaining element. The carriage is configured to execute a forward stroke and a backward stroke. The stroke moves the carriage in the conveying direction from a starting position thereof. The backward stroke moves the carriage against the conveying direction and towards the starting position. The retaining element on the carriage transitions between a first, in which the retaining element remains outside the container path, and a second state, in the retaining element extends into the container path to affect the container flow.

In another aspect, the invention features a method for processing containers in a container-processing machine. Such a method includes identifying a first container behind an adjacent second container in a container flow, the first container being positioned within the container flow such that the first container will, absent intervention, occupy a first processing position that has been designated as not to be occupied by any container, holding the first container back, thereby causing the first container to move with a second velocity, that is less than the first velocity, forming a gap between the first and second containers, and releasing the first container. As a result of having been held back, will now occupy a second processing position instead of the first processing position.

As used herein, expressions such as "substantially" or "approximately" refer to deviations from an exact value in each case by ±10%, and preferably by ±5% and/or deviations in the form of changes not significant for function.

As used herein, "containers" include cans, bottles, tubes, pouches, whether made of metal, glass and/or plastic, as well as other packages, in particular those that are suitable for filling with liquid or viscous products, or those suitable for filling with powder or granulate.

In the case of containers moving with a velocity defined by a velocity vector along a conveying direction, a first point is said to be "downstream" of a second point when the second point can be reached by moving from the first point along the velocity vector. Conversely, a first point is said to be "upstream" of a second point when the second point can be reached by moving from the first point along the negative of the velocity vector.

Further developments, benefits, and application possibilities of the invention arise also from the following description of examples of embodiments and from the figures. Moreover, all characteristics described and/or illustrated individually or in any combination are categorically the subject of the invention, regardless of their inclusion in the claims or reference to them. The content of the claims is also an integral part of the description.

BRIEF DESCRIPTION OF THE DRAWINGS

These and other features of the invention will be apparent from the following detailed description and the accompanying figures, in which.

DETAILED DESCRIPTION

Figure 1:
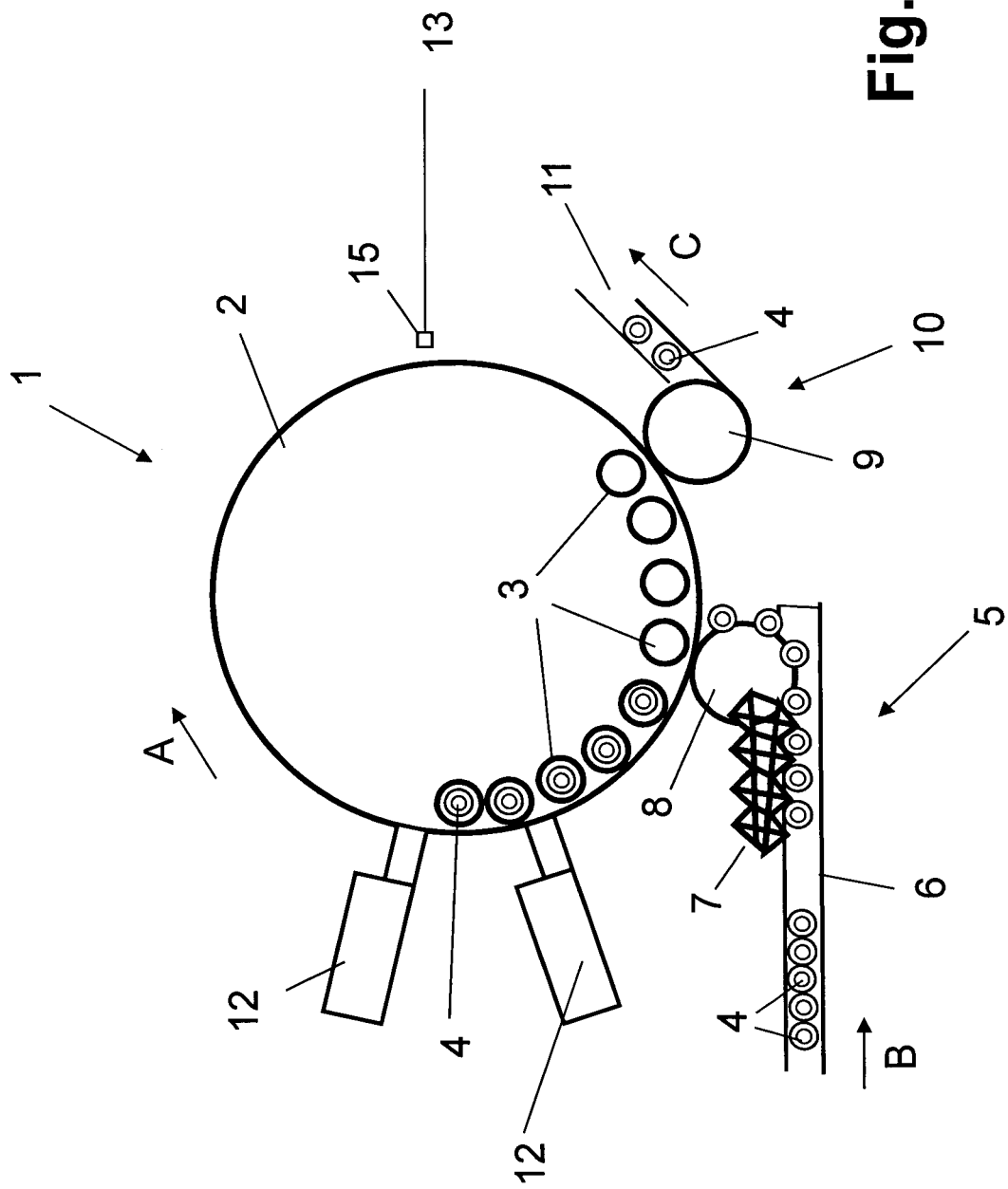
FIG. 1 is a plan view of a container-processing machine.

FIG. 1 shows a container-processing machine 1 of a circulating design having a rotor 2 that can be driven about a vertical machine axis in a rotating direction A. Processing positions 3 are provided on a circumference of the rotor 2. The processing positions 3 are offset from each other at regular angular distances about the vertical machine axis.

Each processing position 3 accepts one container 4 to be processed. The container 4 is oriented with its container axis in a vertical direction so that it is parallel or substantially parallel to the machine axis.

A container feed 5 individually feeds containers to be processed 4 to the processing positions 3. The container feed 5 spaces the containers apart along an axis in a manner consistent with the spacing between successive processing positions 3 on the circumference of the rotor 2.

The container feed 5 includes a conveying path 6 formed by a conveyor. In the illustrated embodiment, the conveying path 6 extends in a straight line. A single track of containers 4 is fed in an incoming conveying direction B along this conveying path 6. This results in a container flow moving with a conveyor velocity. In fault-free operation of the container-processing machine 1, when all the processing positions 3 are working correctly the containers 4 are directly adjacent to each other with essentially no gap between them.

The container feed 5 also comprises a dividing worm 7 and a first conveyor star 8. The dividing worm 7 acts as a spacing transformer to convert the spacing between containers 4 on the conveying path 6 so that it conforms to the spacing between successive processing positions 3 on the circumference of the rotor 2. The first conveyor star 8 receives the spaced containers 4 from the dividing worm 7 and loads them into processing positions 3.

At a container outlet 10, a second conveyor star 9 receives processed containers 4 from the processing positions 3 and places them on an external conveyor 11, which then takes them away along an outgoing conveying direction C towards a further use and/or for further processing. The dividing worm 7 and the first and second conveyor stars 8, 9 are all driven synchronously with the rotor 2.

The processing positions 3 actually carry out their container processing only as the rotor 2 carries them through a processing sector defined by the rotor's rotary movement. The processing sector extends between the container feed 5 and the container outlet 10.

In the illustrated embodiment, the container-processing machine is a labeling machine in which the rotor 2 carries the processing positions 3 past labeling units 12. The container-processing machine can however also be designed for another kind of processing of the containers at the processing positions 3. For example, in a container-printing machine for printing on the containers 3, the labeling units 12 would be replaced by print heads.

Figure 2:
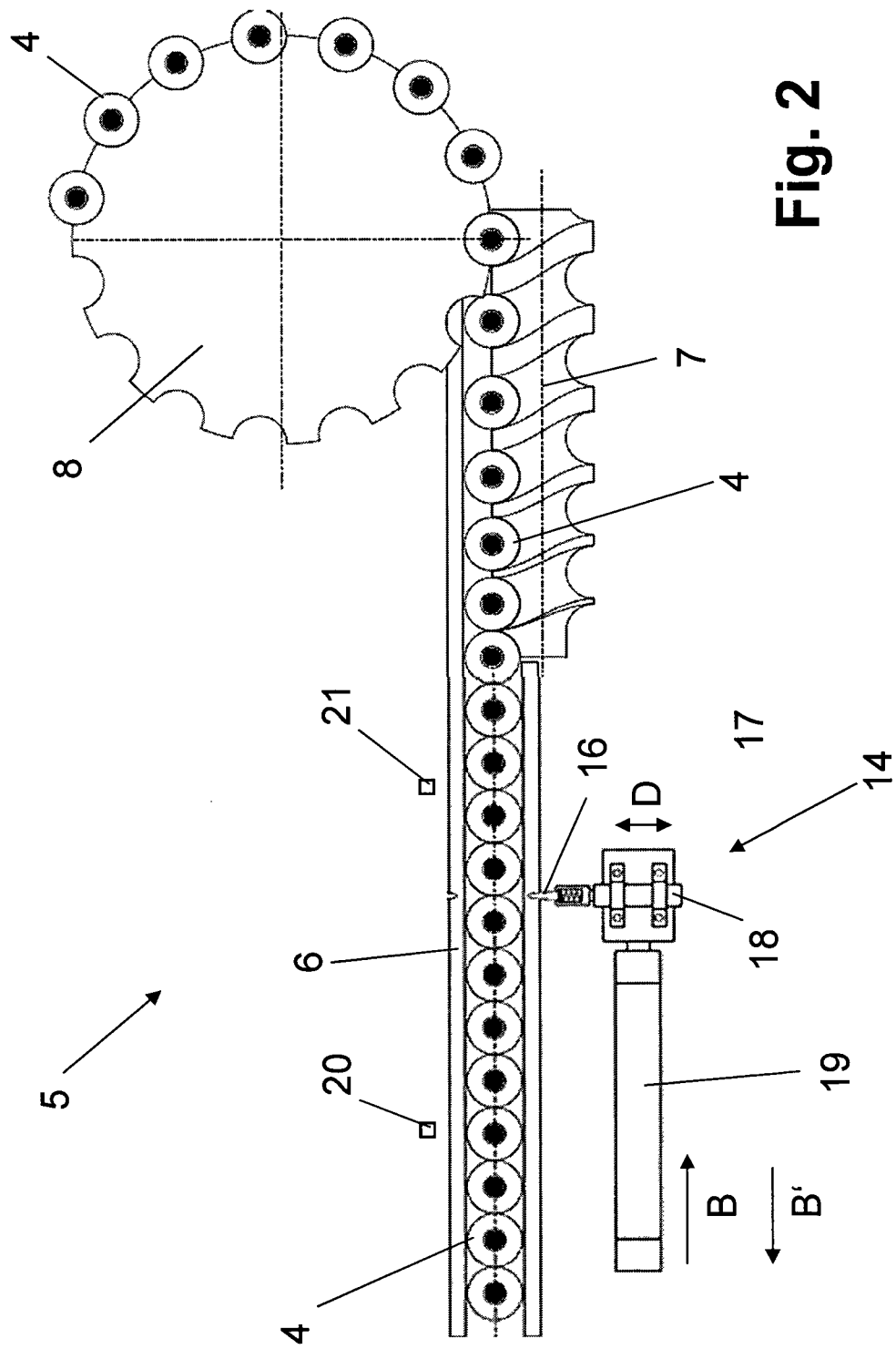
FIGS. 2 and 3 show a retaining element of the container-processing machine FIG. 1 in two operating states.
Figure 3:
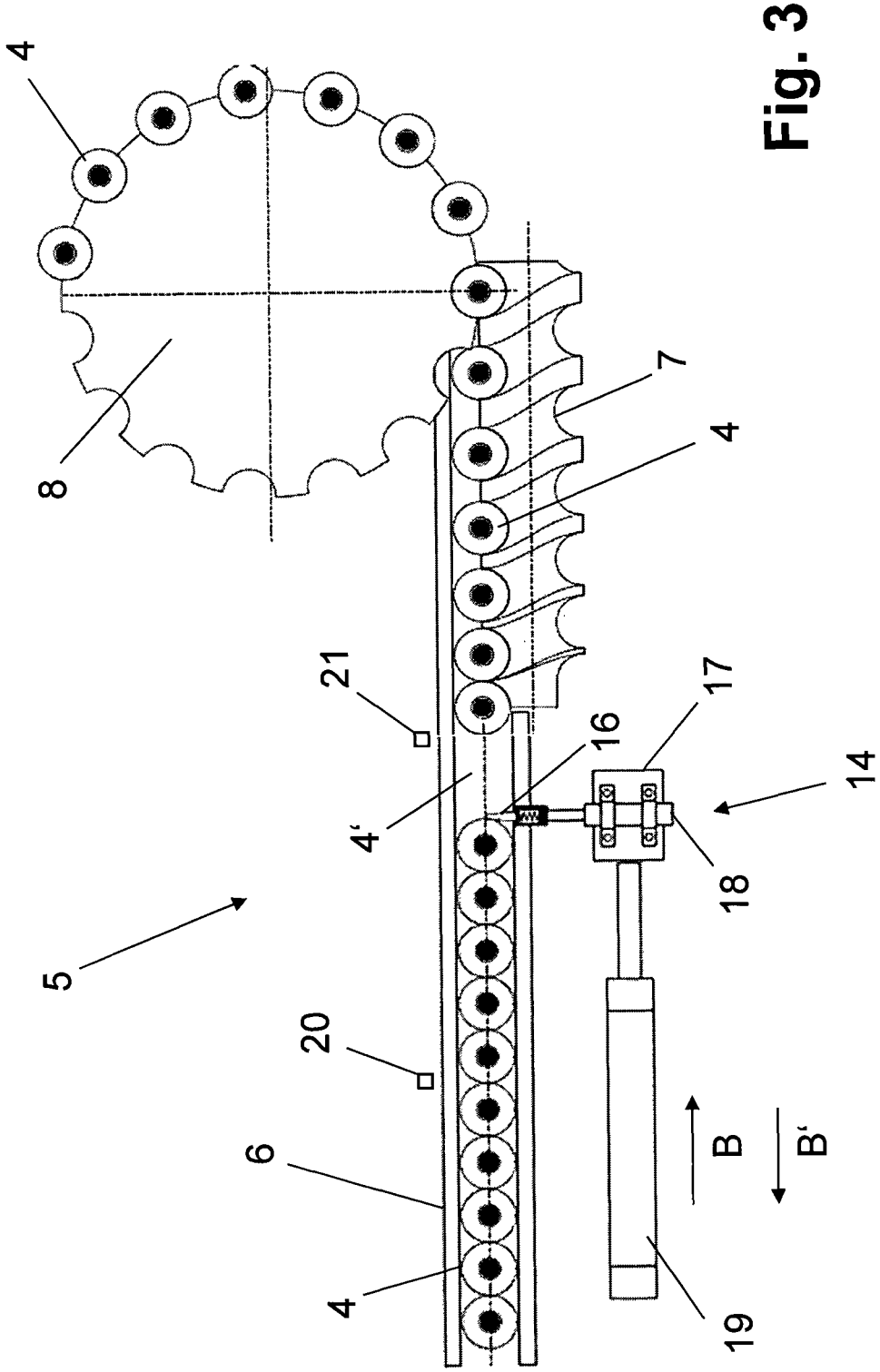

A process computer 13 controls a retaining installation 14 shown in FIGS. 2 and 3 as being installed at the container feed 5 just upstream of the dividing worm 7. The retaining installation 14 causes gaps in the flow of containers into the processing positions 3 and does so in a targeted and controlled manner such that no containers are moved to a defective processing position 3.

A first sensor 15 provides the computer 13 with information that correlates particular processing stations 3 with positions of containers 4 in the incoming container flow. As a result, the computer 13 is able to determine which processing station 3 will be receiving the next container from the incoming container flow. In addition, the computer 13 is provided with a list of faulty processing positions 3. As a result, the computer 13 is in a position to instruct the retaining installation 14 to prevent a faulty processing position 3 from receiving a container 4.

Upon recognizing that, without its intervention, a container 4 will be loaded into a faulty processing position 3, the computer 13 issues an instruction to the retaining installation 14 to hold back a particular container until a suitable processing station 3 is available to receive it.

The retaining installation 14 comprises a finger-like retaining element 16 on a carriage 17. The retaining element 16 extends horizontally or substantially horizontally along a retaining direction D that is perpendicular to the incoming conveying direction B. A first actuator 18 causes the retaining element 16 to transition between an inactive state, shown in FIG. 2, and an active state, shown in FIG. 3.

To transition the retaining element 16 into the inactive state, the first actuator 18 moves the retaining element 16 along the retaining direction D away the conveying path 6 until it is completely withdrawn and no longer interferes with container flow, as shown in FIG. 2.

To transition the retaining element 16 into the active state, the first actuator 18 moves the retaining element 16, along the retaining direction D toward the conveying path 6. As a result, the retaining element 16 extends into the movement path of the containers 4 approaching the conveyor worm 6, thus blocking the containers' progress, as shown in FIG. 3. This creates a gap 4' in the container flow just upstream of the dividing worm 7 so that no container is moved into the faulty processing position 3.

The retaining installation 14 also has a second actuator 19 that moves the carriage 17, together with the retaining element 16 wither along the conveying direction B or against the conveying direction B' between a start position, shown in FIG. 2, and an end position, shown in FIG. 3. In the start position, the carriage 17 and thus the retaining element 16 too is at a greater distance from the dividing worm 7 than it is in the end position.

In some cases, the computer 13 recognizes that there are no faulty processing positions 3. Therefore, every processing position 3 is to be occupied by a container 4. In that case, the computer 13 causes the carriage 17 and the retaining element 16 to remain in their starting position so that the single-track and compactly arranged container flow remains uninterrupted.

In other cases, the computer 13 recognizes that a particular processing position 3 is faulty and should not be occupied. In response, the computer 13 identifies, on the conveying path 6, a particular container 4 that would normally be fed to this processing position 3. Then, under instructions from the computer 13, the second actuator 19 accelerates the carriage 17 until the retaining element 16 is just ahead of the particular container 4. Having caught up with the particular container 4, the second actuator 19 adjusts the carriage's velocity to match that of the particular container 4 so that the retaining element 16 now moves synchronously with the flow of containers on the conveying path 6.

The first actuator 18 transitions the retaining element 16 into its active state so that it now acts as a barrier in front of the particular container 4. With the retaining element 16 now in place, the second actuator 19 decelerates the carriage 17. This causes a gap 4' to form in the container flow downstream of the particular container 4.

After having created a suitable gap 4', the first actuator 18 transitions the retaining element 16 into the inactive state. The second actuator 19 then moves the carriage 17 against the incoming conveying direction and back to its starting position. This releases the particular container 4 so that it again proceeds towards the first conveyor star 8 at the conveyor velocity. However, as a result of having been delayed, the particular container 4 will arrive too late to be loaded into the faulty processing position 3 and will instead be loaded into a functioning processing position 3.

In a preferred embodiment, the first actuator 18 does not withdraw the retaining element 16 immediately after the gap 4' has been formed. Instead, with the retaining element 16 still in the active state, the second actuator 19 accelerates the carriage 17 to again match the conveying velocity of the conveying path 6. The carriage 17 brings the retaining element 16 directly to the dividing worm 7 so that the retaining element 16 continues to support the particular container 4 until it has been loaded onto the dividing worm 7. At the feed of the dividing worm 7, the first actuator 18 withdraws the retaining element 16 into its inactive state and the second actuator 19 begins to move the carriage 17 back to its starting position.

To assist in controlling the retaining installation 14, it is useful to provide second and third sensors 20, 21 to detect containers 4 on the conveying path 6, to monitoring formation of the gap 4', and to transmit such information back to the computer 13, which then relies upon it to control the retaining installation 14.

Figure 4:
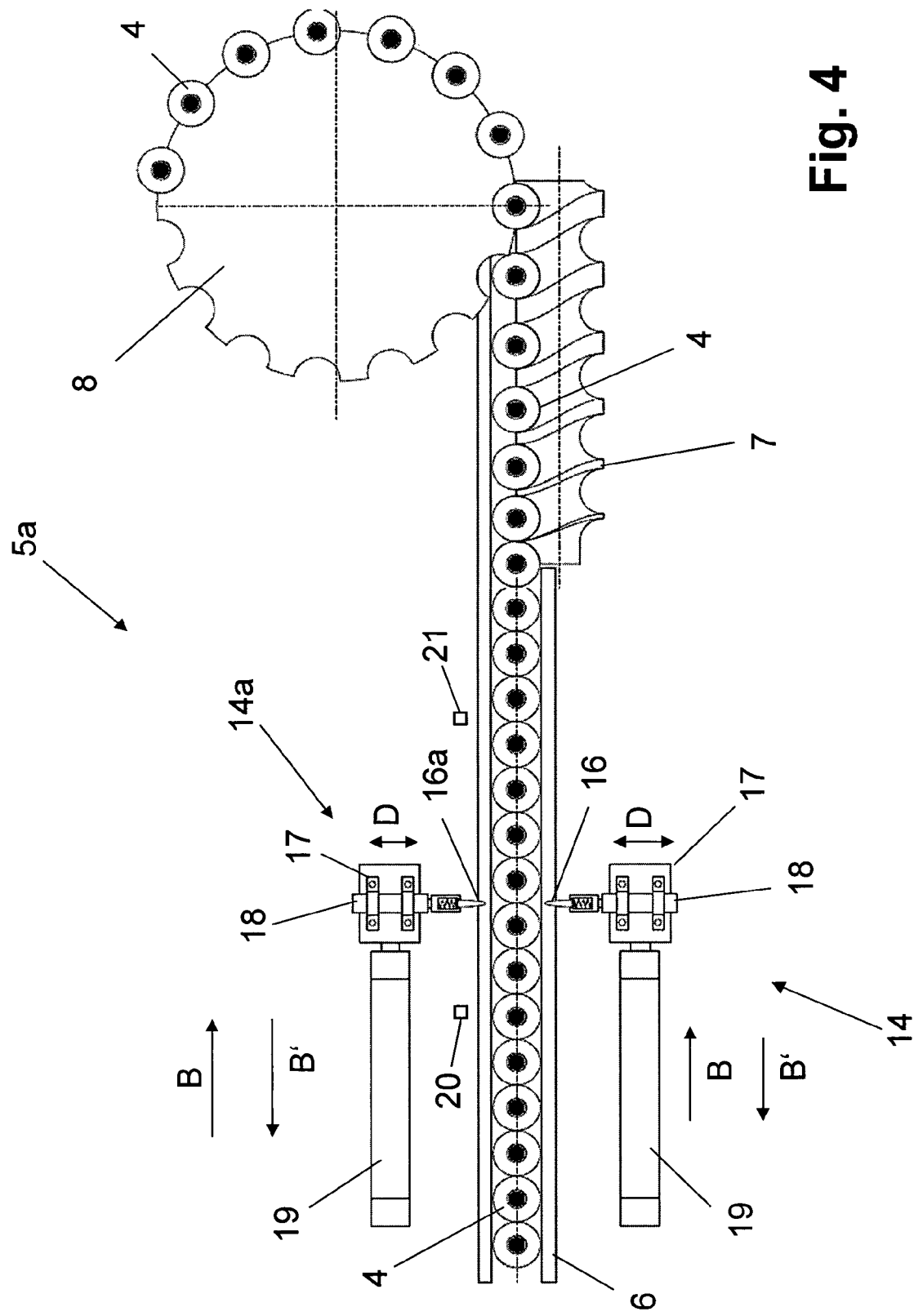
FIGS. 4 and 5 show an embodiment similar to that shown in FIGS. 2 and 3 but with dual retaining elements.
Figure 5:
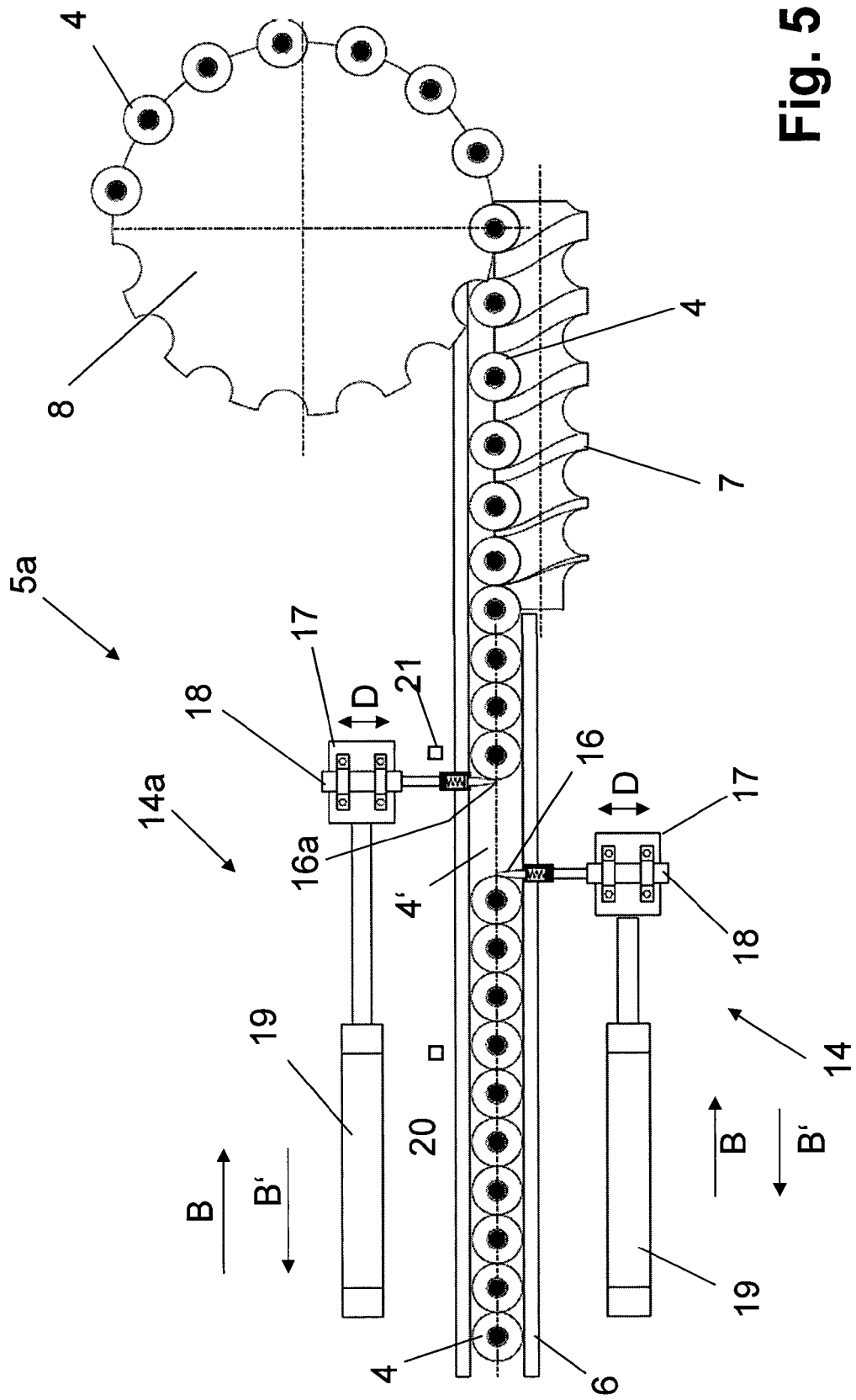

An alternative embodiment, shown in FIGS. 4 and 5, features a pair of identical first and second retaining installations 14, 14a disposed in opposite sides of the conveying path 6. Up to the point shown in FIG. 4, the first and second retaining installations 14, 14a both work in a manner identical to that described in connection with the embodiment of FIGS. 2 and 3. As shown in FIG. 4, both retaining elements 16, 16a are directly between first and second containers and ready to form a gap 4' between the first and second containers.

To form a gap, the second actuator 19 of the first retaining installation 14 decelerates the carriage 17 in the manner already described in connection with FIGS. 2 and 3. However, the second actuator 19 of the second retaining installation 14a does not decelerate its carriage 17. As a result, as the gap 4' forms, the first retaining element 16 remains directly in front of, or downstream from, the first container but the second retaining element 16a remains directly behind, or upstream of, the second container. This prevents the second container from toppling over backwards.

In an alternative embodiment, the first and second retaining installations 14 and 14a are arranged on the same side of the conveying path 6 but one on top of the other so that they do not interfere with each other's operation.

Having described the invention, and a preferred embodiment thereof, what is claimed as new, and secured by Letters Patent is:

1. A method for processing containers in a container-processing machine comprising a plurality of processing positions formed on a circulating conveyor, said method comprising causing said containers to form a container flow that flows with a first velocity along a container path in a conveying direction, obtaining information indicative of an association between a position of a container in said container flow and a defined processing position on said conveyor, designating a first processing position from said plurality of processing positions as not to be occupied by any container, identifying a first container behind a second container in said container flow, said first container being positioned within said container flow such that said first container will, absent intervention, occupy said first processing position, holding said first container back, thereby causing said first container to move with a second velocity, that is less than said first velocity, holding said first container back to form a gap between said first and second containers, releasing said first container, and causing said first container to occupy a second processing position instead of said first processing position, said method further comprising using a supporting element to support said second container while forming a gap between said first and second containers, and withdrawing said supporting element when said second container reaches a feed that spaces said containers from each other prior to transferring said containers to processing positions.

2. The method of claim 1, wherein designating a first processing position from said plurality of processing positions as not to be occupied by any container comprises receiving information indicative of a fault in said first processing station.

3. The method of claim 1, wherein holding said first container back comprises causing a retaining element to transition from a first state to a second state, wherein, when said retaining element is in said first state, said retaining element is outside said container path, and wherein, when said retaining element is in said second state, said retaining element acts as a barrier to forward movement of said first container.

4. The method of claim 3, further comprising, after having formed said gap, and with said retaining element in said second state, moving said retaining element at said first velocity, while moving said retaining element, supporting said first container, and, upon reaching a feed that spaces said containers from each other prior to transferring said containers to processing positions, causing said retaining element to transition to said first state.

5. The method of claim 3, wherein holding said first container back comprises, from a starting position of said retaining element, accelerating said retaining element along said conveying direction, while said retaining element is moving at said first velocity, causing said retaining element to transition from said first state to said second state, and, with said retaining element in said second state, decelerating said retaining element to said second velocity thereby causing said first container to decelerate to said first velocity.

6. The method of claim 5, further comprising, after having formed said gap, accelerating said retaining element to said first velocity, and causing said first container to resume motion at said first velocity.

7. The method of claim 3, further comprising, after having formed said gap, causing said retaining element to move in a direction opposite said conveying direction to a starting position thereof.

8. The method of claim 1, wherein using said supporting element comprises accelerating said supporting element from a starting position thereof, in which said supporting element is outside said conveying path, and, upon reaching a supporting position between said first and second containers, causing said supporting element to move at said first velocity so as to cause said supporting element to move synchronously with said containers in said container flow.

9. The method of claim 1, further comprising selecting said containers to be standing bottles and wherein said processing positions comprise recesses for accommodating said bottles.

10. The method of claim 1, further comprising selecting said containers to be glass bottles.

11. An apparatus comprising a container-processing machine for processing containers, wherein said container-processing machine comprises a circulating conveyor, processing positions, a container feed, and a retaining element, wherein said processing positions are disposed around said conveyor, wherein said container feed defines a container path in which containers moving at a first velocity in a conveying direction are brought towards said processing positions, wherein said processing positions comprise a first processing position and a second processing position, wherein said first processing position has been designated to remain unoccupied by any container, wherein said second processing position is available for being occupied by a container, wherein said containers on said container path define a container flow such that a position of a container in said container flow is indicative of a particular processing position that is to be occupied by said container, wherein said containers comprise a first container and a second container adjacent to said first container, wherein, in the absence of intervention by said retaining element, said first container would occupy said first processing position, wherein said retaining element is configured to hold back said first container thereby causing a gap to form between said first container and said second container, and wherein, as a result of said gap, said first container occupies said second position instead of said first position, said apparatus further comprising a supporting element that is configured to move at said first velocity and to support said second container, a carriage, a computer, and a sensor, wherein said retaining element is disposed on said carriage, wherein said sensor correlates processing stations with positions of containers, and wherein said computer determines which processing stations are expected to receive which containers.

12. The apparatus of claim 11, wherein said retaining element is configured to be moved from a starting position outside said container path and into a retaining position in which said retaining element holds back said first container.

13. The apparatus of claim 12, further comprising a process computer configured to control said retaining element such that said retaining element moves synchronously with said container flow while supporting said first container until said first container reaches a feed that spaces said containers from each other prior to transferring said containers to processing positions at which point said retaining element ceases to support said first container.

14. The apparatus of claim 12, further comprising a process computer configured to cause said retaining element to be accelerated in said conveying direction from a starting position, said acceleration continuing until said retaining element attains said first velocity, to cause said retaining element to transition into a retaining position, to decelerate to a second velocity, to decelerate said first container, and to thereby form a gap between said first and second containers.

15. The apparatus of claim 14, wherein said process computer is further configured to, after having caused said retaining element to form said gap, accelerate said retaining element to said first velocity, and to cause further growth of said gap to cease.

16. The apparatus of claim 11, further comprising a process computer, wherein said process computer is configured to cause said retaining element to return to a starting position thereof after said retaining element has been used to form said gap.

17. The apparatus of claim 11, further comprising a carriage that supports said retaining element, wherein said carriage is configured to execute a forward stroke and a backward stroke, wherein said forward stroke results in movement of said carriage in said conveying direction from a starting position thereof, wherein said backward stroke results in movement of said carriage against said conveying direction and towards said starting position, wherein said retaining element on said carriage is configured to transition between first and second states, wherein, in said first state, said retaining element remains outside said container path, wherein, in said second state, said retaining element extends into said container path to affect said container flow.

18. The apparatus of claim 11, wherein said circulating conveyor comprises a star having recesses for accommodating standing containers.

19. The apparatus of claim 11, wherein said container-processing machine is configured to process bottles.

* * * * *